United States Patent
Vapnik

[19]

[11] Patent Number: 5,950,146
[45] Date of Patent: Sep. 7, 1999

[54] SUPPORT VECTOR METHOD FOR FUNCTION ESTIMATION

[75] Inventor: Vladimir Vapnik, Middletown, N.J.

[73] Assignee: AT & T Corp., Middletown, N.J.

[21] Appl. No.: 08/726,452

[22] Filed: Oct. 4, 1996

[51] Int. Cl.$^6$ ................................................ G06E 1/00
[52] U.S. Cl. ................................ 702/153; 706/20; 706/25
[58] Field of Search .............................. 395/23; 702/153; 706/20, 25

[56] References Cited

U.S. PATENT DOCUMENTS

5,640,492  6/1997  Cortes et al. ............................. 395/23

FOREIGN PATENT DOCUMENTS

0690406  1/1996  European Pat. Off. .
0690406  7/1996  European Pat. Off. .

OTHER PUBLICATIONS

Vladimir N. Vapnik, *The Nature of Statistical Learning Theory*, pp. 151–156 (Springer–Verlag 1995).

*Primary Examiner*—Kamini Shah

[57] ABSTRACT

A method for estimating a real function that describes a phenomenon occurring in a space of any dimensionality. The function is estimated by taking a series of measurements of the phenomenon being described and using those measurements to construct an expansion that has a manageable number of terms. A reduction in the number of terms is achieved by using an approximation that is defined as an expansion on kernel functions, the kernel functions forming an inner product in Hilbert space. By finding the support vectors for the measurements one specifies the expansion functions. The number of terms in an estimation according to the present invention is generally much less than the number of observations of the real world phenomenon that is being estimated.

44 Claims, 2 Drawing Sheets

SUPPORT VECTOR METHOD FOR FUNCTION ESTIMATION

FIELD OF THE INVENTION

This invention relates to the fields of function approximation, regression estimation and signal processing. More particularly, the invention relates to practical methods and apparatus for carrying out the method for estimating functions of any dimensionality to thereby permit such apparatus to provide a superior performance.

BACKGROUND OF THE INVENTION

Function estimation is a branch of mathematics having many real world applications. For example, function estimation may be applied to a finite number of noisy measurements (or "observations") for the purpose of approximating a function that describes the phenomenon being measured. Existing techniques of function estimation generally use the expansion:

$$f(x) = \sum_{i=1}^{N} \alpha_i \phi_i(x) \qquad (1)$$

where f(x) is the approximating function, $\phi_i(x)$ are a plurality of a priori chosen functions, $\alpha_i$ are scalars, and "N" is the number of terms in the expansion. Accordingly, to estimate a function using equation (1), one must estimate the scalars $\alpha_i$. The equation may be readily applied to one or two dimensional data, however its application to data of three or more dimensions is limited by the "curse of dimensionality".

The curse of dimensionality is well known among mathematicians. It refers to the exponential increase in complexity of the estimating function that occurs as the dimensionality of the data being estimated increases. For example, if a one dimensional curve may be estimated with reasonable accuracy by using 20 terms (N=20), then the estimation of a two dimensional surface with reasonable accuracy requires $20^2$ terms (N=$20^2$). A three dimensional surface requires $20^3$ terms, and so on. Thus, as the dimension of the function to be estimated increases, the number of terms required rapidly reaches the point where even the most powerful computers can not handle the estimation in a timely manner.

SUMMARY OF THE INVENTION

The present invention provides a method for approximating functions of any dimensionality by an estimating function having a manageable number of terms. The reduction in the number of terms is achieved by using the expansion:

$$f(x) = \sum_{i=1}^{l} a_i K(x, x_i) + b \qquad (2)$$

where $K(x,x_i)$ is a positively defined kernel function having two vector variables that define an inner product in some Hilbert space. The $a_i$ are scalars, and the $x_i$ are subsets of the measured data called support vectors. The number of terms required when approximating a function with this expansion depends on the complexity of the function being estimated and on the required accuracy of the approximation, but not on the dimensionality of the function being estimated.

DETAILED DESCRIPTION

Figure 1:
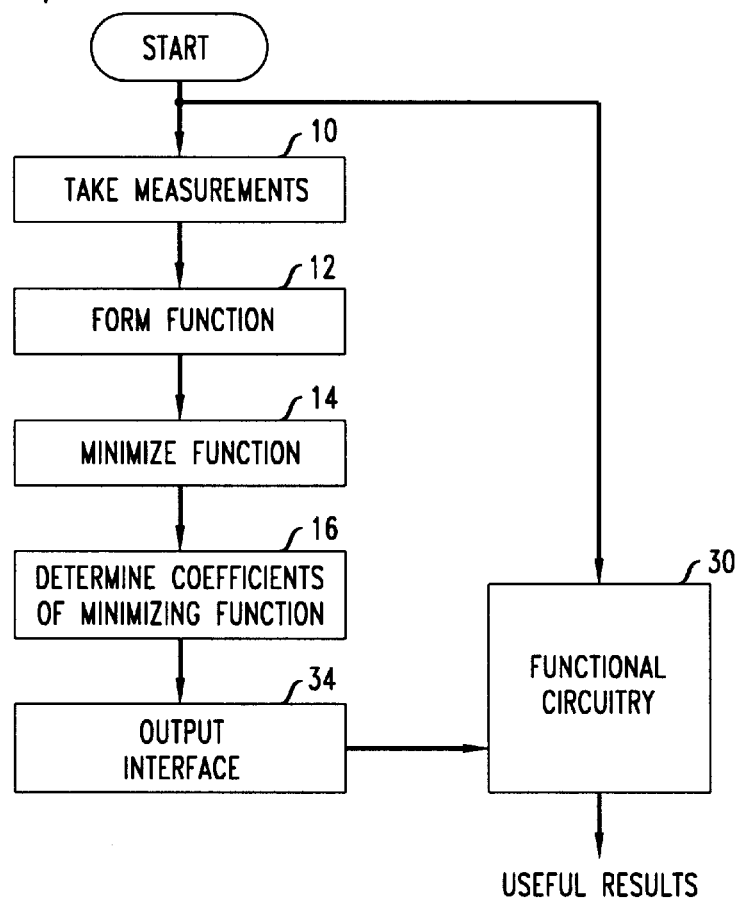
FIG. 1 is a flow chart depicting the steps taken in estimating a function according to the present invention.

As stated above, function estimation is often applied with a number of measurements or observations are available, and the desire is to develop a function that describes the behavior of a system. To elaborate there are many applications where measurements improve the operation of a system. One very common example is found in today's modems. When a one modem is initially connected to another modem, the two modems exchange "training signals". Those signals are used by the receiving modems to set gain and echo cancellation parameters so that the modems can exchange data at the highest bit rate that the communication path can sustain. The modem example illustrates a system that makes measurements, implicitly evaluates parameters, and adjusts itself.

A number of observations may be made about this conventional use of measurements. First, whatever is ascertained in consequence of evaluating the measurements need not be limited to use within the apparatus that performs the measurements and the evaluations. It can be a used by apparatus outside the apparatus that performs the calculations and develops the evaluations from received measurement. Second, whatever is ascertained in consequence of evaluating the measurements need not be limited to immediate use. It can be a future use of the evaluations, within the apparatus the performs the evaluations, or outside it. Third, the parameters that control a modem's operation and which are evaluated in the modem assumed to be static. Therefore, the control signals developed for control the operation of the modem after the training session are also static. They are evaluated once, and the modem's operation is set based on those static control signals.

This invention a) permits the information developed in response to measurements to be used within the apparatus the performs the calculations on the measurement, or outside it; b) permits the developed information to be used immediately, or stored for future use; c) permits the developed information to represent behavior that is functionally related to past behavior; and d) permits the developed information to be translated to software control signals or to electronic control signals, with the latter controlling other hardware, including a display monitor.

As already mentioned, the capabilities of this invention are achieved by developing a function estimate of the measured behavior. This function estimate permits decisions to be made about incoming information based on the function estimate, and to also augment, or improve, the estimate based on the incoming information. In the context of a modem, for example, this invention permits the control signals to be set based not so much on the state of the relevant transmission parameters at one moment of measurements (training session) but on an entire history of the communication path measurements. The decision may be to modify the control parameters of the circuitry that decides whether the information on an incoming signal is a "1" or a "0," but it can also be intimately involved with the actual atomic decision process.

On a more macroscopic scale, this invention may be used in applications where users want assistance with everyday decisions. For example, unsolicited e-mail is a common e-mail problem (which some people believe will worsen with time). Employing the principles disclosed herein, a multi-dimensional function estimate can be developed based on information of past-received unsolicited e-mail, and that function estimate may be applied to a program that would evaluate an incoming e-mail message and decide whether it is of the unsolicited e-mail variety or not. It might flag the e-mail and, if the user selects a deletion option, might delete the e-mail outright. Such a multi-dimensional function might illustratively take into account the time the e-mail was sent, the length of the message, the salutation of the message, various key words in the message, etc. In such an application, Another illustrative use may involves complex, feature-based, analyses. For example one way to analyze images is to extract agreed-upon features from the image, to classify the images, and to analyze the collection of features so that some statement can be made about the image. A very simple example of that of admission of personnel to a secure location based on a video camera image of the person seeking admission. Normally, each day the person looks a bit different, and the challenge is to correctly identify the person based on knowledge of the variations in that person's image; i.e., based on some function that estimates the variability in that person's image. Of course, in the course is employing the function estimate to admit (or not admit) the person to the secure location, the currently received image can be incorporated within the function estimation disclosed below to improve the function estimate.

Yet another illustration of function estimate use may be prediction, such as predicting the behavior of stock values, weather, and similar systems which, at least currently, are deemed to be stochastic. With the enhancements made available by this invention, many more dimensions can be handled to form a multi-dimensional function estimate that may estimate the weather (say, for the next 12 hours), or the movement of the stock marks (say, for the next day). In an arrangement, it is possible that some functional operations are performed in response to incoming information and the function estimate—such as having a computer execute "buy" or "sell" orders on the stock market, or automatically broadcast tornado warnings. However, but it is also possible that no functional operations are performed. Rather, it is possible for the developed multi-dimensional function to be displayed to a user, and allow the user to make decisions in response to what is displayed.

FIG. 1 is a flow chart depicting the steps taken in estimating a real function according to the present invention. The real function to be estimated will generally be descriptive of some physical phenomenon that occurs in an "n" dimensional space. Accordingly, the first step in estimating a real function is to take measurements of the phenomenon that is to be described by the estimated function (step 10). For purposes of illustration, the number of measurements is assigned the symbol "1". Each of the 1 measurements is described by a vector "x" and a value "y". The vector $x_i$ describes the position within the n dimensional space at which the $i^{th}$ measurement occurs, and therefore $x_i$ is an n dimensional vector. The value $y_i$ describes the value of the $i^{th}$ measurement. Thus, the measured data is denoted as $(x_1,y_1), (x_2,y_2) \ldots (x_i,y_i)$.

Once the measurements have been acquired, the following functional is formed (step 12) and minimized (step 14).

$$R(\omega) = \frac{1}{l}\sum_{i=1}^{l} \left| y_i - f(\chi_i, \omega) \right|_\epsilon + \gamma(\omega, \omega), \quad (3)$$

where $$|y - f(\chi, \omega)|_\epsilon = \begin{cases} 0 & \text{if } |y - f(x, \omega)| < \epsilon, \\ |y - f(x, \omega)| - \epsilon & \text{otherwise)} \end{cases} \quad (4)$$

$(\omega, \omega)$ is the inner product of two vectors, $\gamma$ is some constant, and $f(x, \omega)$ is a set of functions that can be described as follows $$f(x, \omega) = \sum_{i=1}^{\infty} \omega_i \phi_i(x) \quad (5)$$

The $\epsilon$ referred to in equations (3) and (4) is an error tolerance which is chosen a priori. It describes the maximum amount that the estimated function may deviate from the actual function described by the measured data. This is an unusual approach to estimation. Conventionally, a function is estimated by forming a cost function for the difference between the estimated function and the estimating function, and that cost is sought to be minimized. The best is estimate is reached when the cost is zero.

Figure 3:
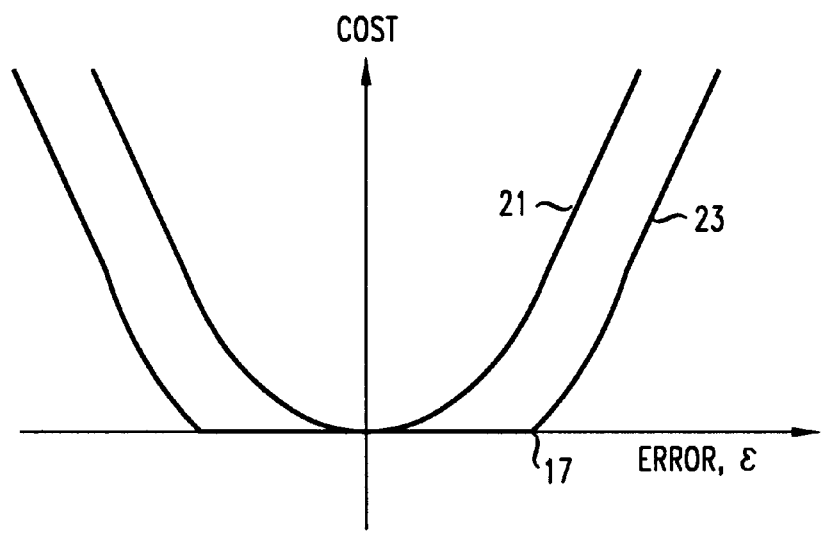
FIG. 3 is a graph that illustrate the cost generated by the cost function as a function of the estimation error.
Figure 4:
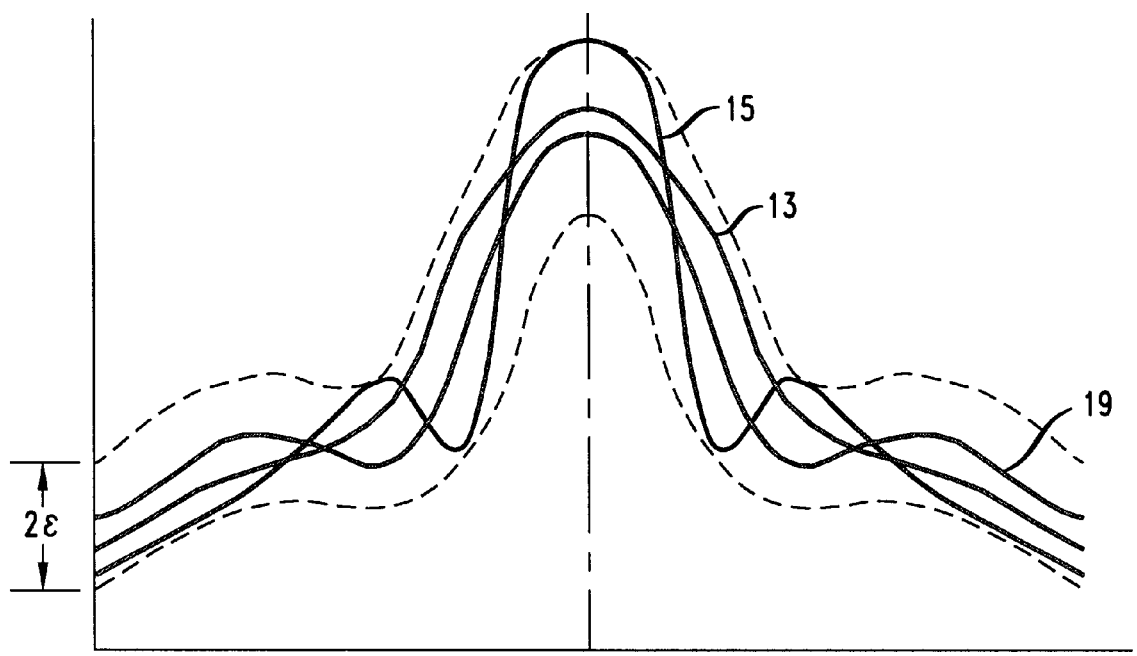
FIG. 4 is a graph that illustrate the cost function insensitive to $\epsilon$.

This is illustrated by curve 21 of FIG. 3, where the described function shows the cost generated by the cost function as a function of the estimation error. A careful reading of the above would reveal to a skilled artisan that the cost function of equation (3) is more like the curve shown in FIG. 4. From FIG. 4 is can be easily observed that the cost function is insensitive to $\epsilon$, in the sense that once $\epsilon$ is lower than a certain level (point 17) it does not matter whether $\epsilon$ is reduced further. When the function to be estimated is multi-dimensional, equation (3) effectively described a multi-dimensional tube centered about the function to be estimated. This is shown in FIG. 4 for a one-dimensional function where curve 19 is the curve to be estimated, and curves 13 and 15 are curves that estimate curve 19 within $\epsilon$. Note the marked difference between curves 13 and 15. The fact that markedly different curves meet the same given cost criterion provides a great degree of flexibility, providing an advantage users of this invention over users of prior art methods.

The function that minimizes the functional described in (3) is:

$$f(x, \alpha, \alpha^*) = \sum_{i=1}^{l} (\alpha_i^* - \alpha_i)(\Phi(x_i), \Phi(x)) + b \quad (6)$$

where $\alpha_i^*, \alpha_i \geq 0$ with $\alpha_i\alpha_i=0$; and $(\Phi(x_i),\Phi(x))$ is the inner product of two elements of Hilbert space, where $\Phi(x)$ is defined as $\Phi(x)=(\Phi_1(x),\Phi_2(x) \ldots \Phi_k(x), \ldots )$.

Thus, in order to minimize the functional, coefficients $\alpha_i^*$ and $\alpha_i$ of equation (3) must be determined (step 16). This is done by solving the following quadratic optimization problem:

$$W(\alpha^*, \alpha) = -\epsilon \sum_{i=1}^{l} (\alpha_i^* + \alpha_i) + \sum_{i=1}^{l} y(\alpha_i^* - \alpha_i) - \frac{1}{2} \sum_{ij=1}^{l} (\alpha_i^* - \alpha_i)(\alpha_j^* - \alpha_j)(\Phi(x_i), \Phi(x_j)) \quad (7)$$

subject to the constraints $$\sum_{i=1}^{l} (\alpha_i^* - \alpha_i) = 0, \quad 0 \le \alpha_i, \alpha_i^* \le C, \quad i = 1, \ldots, l \quad (8)$$

With respect to the solution of equation (6) it is important to note that only some of the coefficients $\alpha_i^* - \alpha_i$ differ from zero. Also, in equation (6) the vectors $x_i$ are called Support Vectors (SV) and equation (6) is said to describe an expansion on SV.

In both equations (6) and (7), one can evaluate the inner products $(\Phi((x_i), \Phi(x))$ by using the general form of the inner product in Hilbert space. According to Hilbert space theory, to guarantee that a symmetric function $K(u, v)$ has an expansion $$K(u, v) = \sum_{k=1}^{\infty} a_k \phi_k(u) \phi_k(v) \quad (9)$$

with positive coefficients $a_k > 0$, i.e. to guarantee that $K(u, v)$ is an inner product in some feature space $\Phi$, it is necessary and sufficient that the conditions $$\int K(u,v) g(u) g(v) du dv > 0 \quad (10)$$

be valid for any non-zero function $g$ on the Hilbert space (Mercer theorem). Therefore, equation (6) can be replaced with $$f(x, \alpha, \alpha^*) = \sum_{i=1}^{l} (\alpha_i^* - \alpha_i) K(x, x_i) + b \quad (11)$$

where the inner product $(\Phi(x_i), \Phi(x))$ is defined through a kernel $K(_i, x)$. In which case, to find coefficients $\alpha_i^*$ and $\alpha_i$ one has to maximize the function $$W(\alpha^*, \alpha) = -\epsilon \sum_{i=1}^{l} (\alpha_i^* + \alpha_i) + \sum_{i=1}^{l} y(\alpha_i^* - \alpha_i) - \frac{1}{2} \sum_{ij=1}^{l} (\alpha_1^* - \alpha_1)(\alpha_j^* - \alpha_j) K(x_i, x_j) \quad (12)$$

subject to the constraints of equation (8).

Coefficients $\alpha_i^*$ and $\alpha_i$ are scalars, and therefore equation (11) may be rewritten as $$f(x) = \sum_{i=1}^{l} a_i K(x, x_i) + b \quad (13)$$

where $K(x, x_i)$ is a positively defined kernel function having two vector variables that define an inner product in some Hilbert space. The $a_i$ in equation (13) are scalars, and the $x_i$ are subsets of the measured data called support vectors. The number of terms required when approximating a function with the expansion of equation (13) depends on the complexity of the function being estimated and on the required accuracy of the approximation, but not on the dimensionality of the function being estimated.

Figure 2:
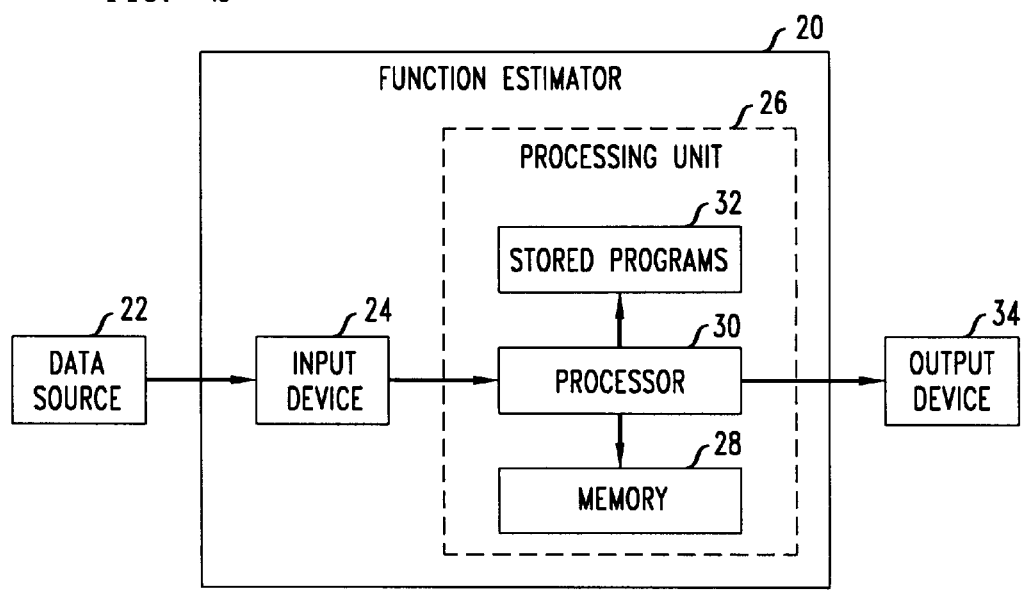
FIG. 2 is a block diagram of a system for estimating real functions according to the present invention.

FIG. 2 is a block diagram of a system for estimating real functions according to the present invention. As mentioned above, the function being estimated will generally describe an "n" dimensional phenomenon of which "1" measurements have been taken. In the system of FIG. 2, these measurements are provided to a function estimator 20 through a data source 22. The estimator operates on the measured data to generate the estimating function.

The data source and function estimator may take many forms. For example, the data source may be the measuring instrument used to generate the measured data, or it may merely be a storage device, such as a disk drive, where measured data is stored. The function estimator may be computer, such as a personal computer, or it may be a single circuit board, such as an expansion board for a personal computer.

In any event, the function estimator includes an input device 24 that receives the measurements from the data source. An example of an input device is an RS-232 port (commonly available on many personal computers). The input device, in turn, relays the measurements to a processing unit 26, where the estimation process of forming a functional, minimizing the functional, and determining the coefficients of the minimizing function is implemented.

In a preferred embodiment, the processing unit includes a memory 28, one or more stored programs 30, and a processor 32. The memory is used to store measurement data received through the input device. It may be, for example, the Random Access Memory (RAM) of a computer. The stored programs are those programs necessary for implementing the estimation process. They may be stored in the Read Only Memory (ROM) of a computer. The processor, which may be the Central Processing Unit (CPU) of a computer, implements the estimation process according to instructions set forth in the stored programs.

In a preferred embodiment, the function estimator includes an output device 34. The output device is used to provide information to the user of the function estimator by, for example, providing a plot of the estimated function superimposed on a plot of the measured data. An example of an output device suitable for use with the invention is a computer display monitor. Use of a monitor as the output device is but one option for an output device. As discussed above, a monitor may be an ideal output device in situations where incoming information is not processed in any way other than as part of the function estimation, and that the results of the determinations—i.e., the function estimate—is sought to be provided to the user so that the user can make some decision(s), such as to issue weather warnings, issue "buy" or "sell" orders on the stock market, etc. Of course, if it is desired for decisions to be made by some processing equipment, output device 34 may be a message communication means, such as a programmed processor to perform computations leading to a decision, and communication apparatus such as a modem under control of the programmed processor. As indicated, above, the results obtained from the function estimation can be used also to directly control whatever function processing is needed to be performed on the incoming data. This is demonstrated in FIG. 2 by element 30, which is responsive to the data of element 22 and to the output of output device 34.

Several embodiments for the invention have been described in detail. However, it should be obvious that there are may further variations evident to persons skilled in the art. The invention is more particularly defined in the appended claims.

I claim:

1. Apparatus for forming a function estimate that characterizes behavior of a system, comprising:
   a) an input device for receiving a plurality of measurements of said behavior of said system;
   b) one or more stored programs that include instructions for
      (i) using said measurements, a kernel function that defines an inner product in Hilbert space, and a chosen error tolerance to form a functional;
      (ii) minimizing said functional to find a plurality of coefficients and a plurality of support vectors, said coefficients and said support vectors corresponding on a one to one basis; and
      (iii) forming said function estimate in a form of an expansion from said kernel, said coefficients, and said support vectors, said expansion having a plurality of terms, each said term constituting a separate dimension of said function estimate and including a first multiplier that is said kernel function as defined by one of said support vectors and a second multiplier that is said coefficient corresponding to said one of said support vectors;
   c) a processor for executing said instructions; and
   d) an output module that develops output signals based on said function estimate for interacting with said system.

2. The invention of claim 1, further comprising a data source for transmitting said measurements to said input device.

3. The invention of claim 1, wherein said input device is an RS-232 port.

4. The invention of claim 1, further comprising a memory for receiving said measurements from said input device and storing said measurements for retrieval by said stored programs.

5. The invention of claim 4, wherein said memory is a Random Access Memory of a computer.

6. The invention of claim 1, wherein said output module is a display device for displaying said function estimate with respect to at least some of said dimensions.

7. The invention of claim 6, wherein said output device is a computer monitor.

8. The apparatus of claim 6 wherein said output signals are adapted to display matter on said display device that assists users to make decisions relative to said system.

9. The invention of claim 1, wherein said stored programs are stored in a Read Only Memory of a computer.

10. The apparatus of claim 1 wherein said output signals are adapted to control electrical circuitry.

11. The apparatus of claim 10 wherein said output signals are adapted to control telecommunication circuitry.

12. The apparatus of claim 11 wherein said output signals are adapted to control modems.

13. The apparatus of claim 11 wherein said output signals are adapted to perform classifications.

14. The apparatus of claim 13 wherein said output signals are adapted to classify images.

15. The apparatus of claim 13 wherein said output signals are adapted to classify electronic mail.

16. The apparatus of claim 1 where said output signals form messages.

17. The apparatus of claim 1 where said output signals form messages that are transmitted to interact with said system.

18. The apparatus of claim 1 where said output signals form messages that assist users in making decisions relative to said system.

19. The apparatus of claim 1 further comprising a second processor, responsive to said measurements and to said output signals, for performing prearranged processing on said measurements.

20. The apparatus of claim 1 further comprising means, responsive to said measurements and to said output signals, for performing prearranged processing on said measurements.

21. A function estimator for estimating a real function that describes a phenomenon in a space of any dimension, comprising:
   a) an input device for forming signals from measurements of the phenomenon;
   b) a processing unit for
      (i) using said measurements, a kernel function that defines an inner product in Hilbert space, and a chosen error tolerance to form a functional;
      (ii) minimizing said functional to find a plurality of coefficients and a plurality of support vectors, said coefficients and said support vectors corresponding on a one to one basis; and
      (iii) forming an expansion from said kernel, said coefficients, and said support vectors, said expansion forming said estimate of the real function and having a plurality of terns, each said term including a first multiplier that is said kernel function as defined by one of said support vectors and a second multiplier that is said coefficient corresponding to said one of said support vectors; and
   c) an output processing unit, responsive to said expansion for developing output signals for forming decisions about said phenomenon.

22. The invention of claim 21, further comprising a data source for transmitting said measurements to said input device.

23. The invention of claim 21, wherein said input device is an RS-232 port.

24. The invention of claim 21, further comprising one or more stored programs for controlling the operation of said processing unit.

25. The invention of claim 24, further comprising a memory for storing said stored programs.

26. The invention of claim 25, wherein said memory is a Read Only Memory of a computer.

27. The invention of claim 21, further comprising an output device responsive to said output-processing unit for displaying the results of said function estimation.

28. The invention of claim 21, wherein said output device is a computer monitor.

29. The invention of claim 27, further comprising a memory for receiving said measurements from said input device and storing said measurements for retrieval by said processing unit.

30. The invention of claim 29, wherein said memory is a Random Access Memory of a computer.

31. A method for forming a function estimate that characterizes behavior or a system describable by a function in a multi-dimensional space, comprising the steps of:
   a) taking a plurality of measurements of said behavior;
   b) using said measurements, a kernel function that defines an inner product in Hilbert space, and a chosen error tolerance to form a functional;
   c) minimizing said functional to find a plurality of coefficients and a plurality of support vectors, said coefficients and said support vectors corresponding on a one to one basis; and d) forming an expansion from said kernel, said coefficients, and said support vectors, said expansion forming said function estimate and having a plurality of terms, each said term including a first multiplier that is said kernel function as defined by one of said support vectors and a second multiplier that is said coefficient corresponding to said one of said support vectors; and e) developing an output signal for interacting with said system.

32. The invention of claim 31, wherein said method is implemented by a computer.

33. The method of claim 31 wherein said output signals are adapted to control electrical circuitry.

34. The method of claim 33 wherein said output signals are adapted to control telecommunication circuitry.

35. The method of claim 34 wherein said output signals are adapted to control modems.

36. The method of claim 34 where said output signals form messages.

37. The method of claim 31 where said output signals form messages that are transmitted to interact with said system.

38. The method of claim 31 where said output signals form messages that assist users in making decisions relative to said system.

39. The method of claim 31 further comprising a set of process steps operating on said measurements and responsive to said output signals, for performing prearranged processing on said measurements.

40. The method of claim 31 where said output signals are fashioned to display elements of said estimate function that assist users to make decisions relative to said system and further comprising a step of applying said output signals to a display device.

41. The method of claim 31 wherein said output signals are adapted to perform classifications.

42. The method of claim 41 wherein said output signals are adapted to classify images.

43. The method of claim 41 wherein said output signals are adapted to classify electronic mail.

44. A method for forming a function estimate that characterizes behavior or a system describable by a function in a multi-dimensional space, comprising the steps of:

performing measurements of activities of said system;

forming a functional from a kernel function that defines an inner product in Hilbert space and a chosen error tolerance criterion that is insensitive to the error in the neighborhood of $-\epsilon$ to $+\epsilon$, for small values of error $\epsilon$;

minimizing said functional for an applied plurality of measurement signals to find a plurality of coefficients and a plurality of support vectors;

forming an expansion from said kernel, said coefficients, and said support vectors, said expansion forming said function estimate and having a plurality of terms, each said term including a first multiplier that is said kernel function as defined by one of said support vectors and a second multiplier that is said coefficient corresponding to said one of said support vectors; and developing an output signal for interacting with said system.

* * * * *